March 17, 1936.  W. W. LASKER  2,034,102
AUTOMATIC STOP DEVICE FOR TABULATING MACHINES
Filed Feb. 28, 1929  8 Sheets-Sheet 2

Fig. 1A.

INVENTOR
William W. Lasker
BY H. A. Sparks
ATTORNEY

March 17, 1936.  W. W. LASKER  2,034,102
AUTOMATIC STOP DEVICE FOR TABULATING MACHINES
Filed Feb. 28, 1929  8 Sheets-Sheet 3

March 17, 1936.   W. W. LASKER   2,034,102
AUTOMATIC STOP DEVICE FOR TABULATING MACHINES
Filed Feb. 28, 1929   8 Sheets-Sheet 5

Fig.5

INVENTOR
W. W. Lasker
BY Barton A. Bean Jr.
ATTORNEY

March 17, 1936.  W. W. LASKER  2,034,102
AUTOMATIC STOP DEVICE FOR TABULATING MACHINES
Filed Feb. 28, 1929  8 Sheets-Sheet 7

INVENTOR
W. W. Lasker
BY Barton A. Bean Jr
ATTORNEY

Patented Mar. 17, 1936

2,034,102

UNITED STATES PATENT OFFICE 2,034,102

AUTOMATIC STOP DEVICE FOR TABULATING MACHINES

William W. Lasker, Brooklyn, N. Y., assignor to Remington Rand Inc., Buffalo, N. Y., a corporation of Delaware Application February 28, 1929, Serial No. 343,411

14 Claims. (Cl. 235—58)

This invention relates to improvements in perforated card controlled tabulating machines of the type shown in Letters Patent of the United States No. 1,245,506, granted to J. Powers, November 6, 1917.

An object of the invention is to provide control mechanism for causing the machine to stop after a predetermined variable number of operations.

Another object is to provide control mechanism for causing the machine to stop after a predetermined variable number of cards have been analyzed.

Another object is to provide control mechanism for causing the machine to stop after a predetermined number of impressions have been made whether of items and totals separately, or of items and totals combined.

Another object is to provide control mechanism which can be readily adjusted to carry out the before-mentioned objects with reference to any number of impressions or cards and which automatically returns to its adjusted position after it has set up a control to cause the machine to stop.

Still another object is to provide manipulative means for causing said control mechanism to return to its adjusted position before it has reached the position in which it effects its control.

Another object is the provision of means operable at will for preventing operation of said control means.

Other objects will appear as the mechanism is described with reference to the accompanying drawings in which.

Figure 1:
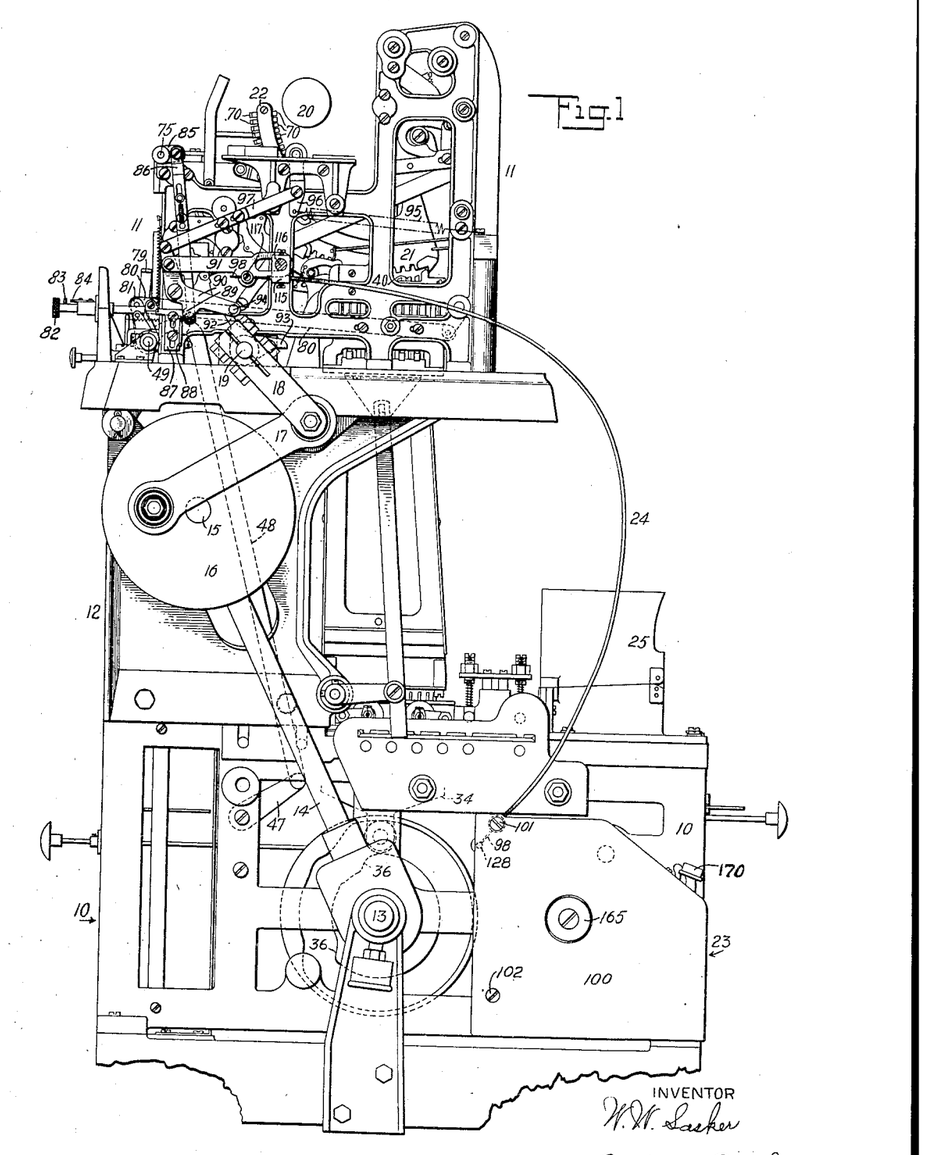
Fig. 1 is a right hand elevation of the tabulating machine to which the invention is shown applied.

Referring to the drawings, Figure 1 shows the right hand side of the machine (the observer being assumed to be in a position to view the adding and printing head from the front).

The machine comprises a base generally indicated at 10, an adding and printing head 11, and a frame 12 supporting the adding and printing head on the base. In the base 10 is the main shaft 13 which drives the feeding and analyzing mechanisms later referred to and which through the usual gear mechanism and shaft 14 drives a shaft 15 supporting a disk 16 connected by a link 17 to an arm 18 secured to the main shaft 19 of the adding and printing head to rock this shaft forward and rearward to perform adding, or adding and printing, or total taking operations as is well understood.

The adding and printing mechanism comprises a plurality of units similar to the well known Dalton adding machines, the mechanism of these units being only generally indicated as they show through the side frame member of the head. The platen 20, adding racks 21, and type carriers 22, and certain other elements will be referred to later.

The improvement is housed in a casing 23 secured to the base of the machine as shown in Figure 1 and is operated from an element in the printing and adding head through a Bowden wire connection 24.

The cards to be analyzed are placed in the supply magazine 25 (Fig. 2) from which they are fed by a picker blade 26 to feed rollers 27 and thence into the registration passage 28 of the analyzing mechanism.

The picker blade 26 is operated by a lever 29 secured to a shaft 30, the lower end of the lever having a connection with a slidable rod 31. This rod is moved to the left due to the action of a cam 32 (Fig. 2A) on the main shaft 13 on a roller on the rod, and to the right by a spring 33. Thus while the supply of cards lasts, this mechanism moves a card into feeding relation with the first pair of feed rollers 27 during the latter part of each cycle of rotation of the main shaft 13.

It is possible to arrest the operation of this machine by three different and separate methods. One is the stopping of the machine when a total has been taken by inserting a total card and a stop card in the pile of cards being analyzed. It is obvious that in most instances the taking of a total is the final operation in a completed job, such as drawing of a bill, entering an account, or finishing a ledger sheet. It is also obvious that the operator desires the machine stopped in order that the bill-head or ledger sheet be removed and a new one placed in the machine. Where a running total or a series of totals are to be taken, the stop card is not used until the operator desires to stop the machine. In the second case, the machine is automatically stopped when no cards are in the bin, or the card feeding mechanism should fail, and the third method of stopping the machine is by a counting mechanism which is set to permit the analyzing of a predetermined number of cards from which will be printed a certain number of items and then a total taken, such as would be desirable when making up a ledger sheet.

Figures 2, 2A:
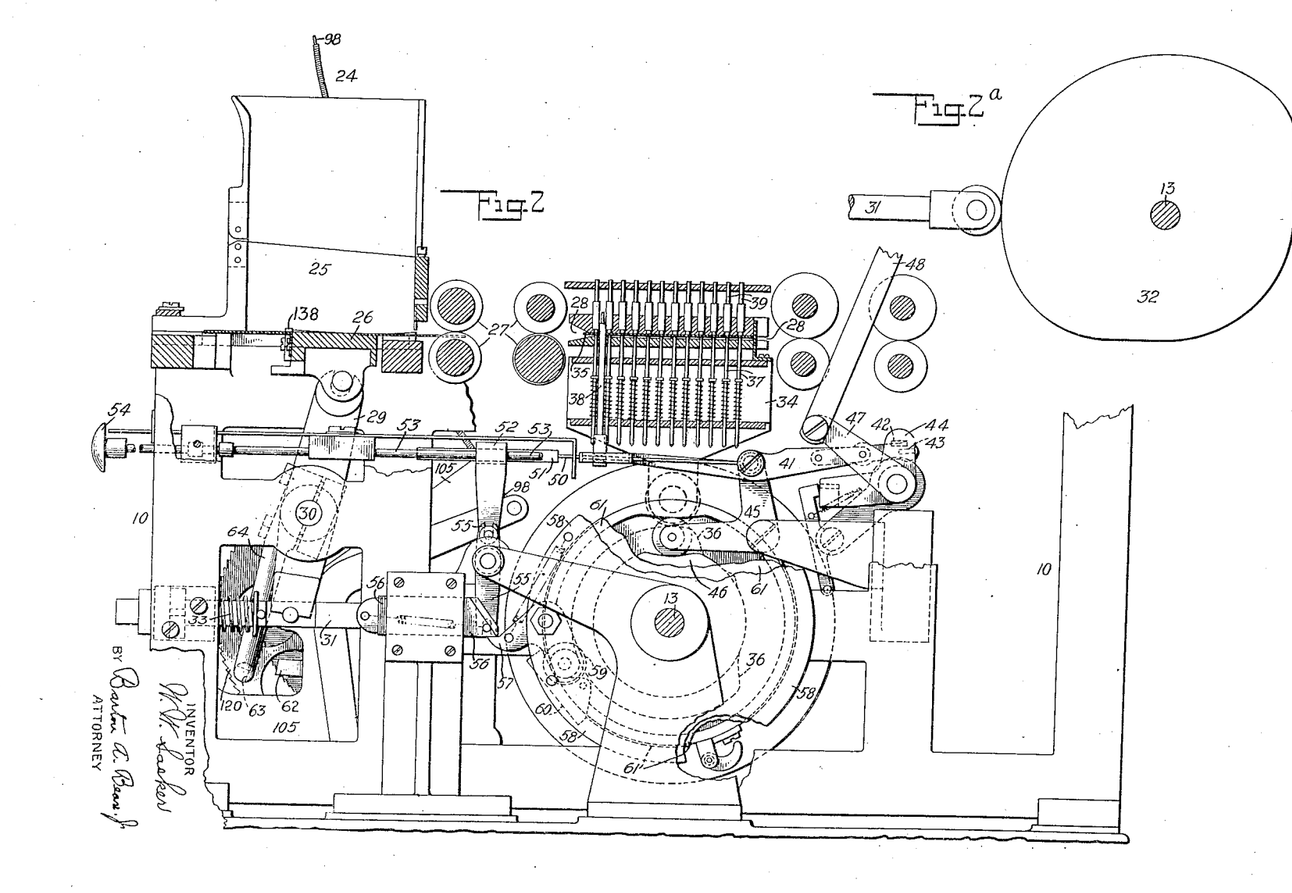
Fig. 2 is a left hand view of the base of the machine, parts being shown in section.
Fig. 2A is a side view of the picker blade operating cam.

The parts of the machine are shown in the stop position in Figure 2 in which the analyzing pin box 34 is in raised position and there is a stop card 35 in the sensing passage. The cams 36 have just raised the analyzing pin box 34 and the analyzing pins 37 and total pin 38, to determine the amount to be added, or added and printed, on the next operation, or to determine the character of operation of the machine.

If the card is an item card, the analyzing pins 37 which find holes in the card will rise and raise pins 39 which through the usual rods (not shown) will set the corresponding pins 40 in the pin carriage of the adding and printing head (Fig. 1), to control the movement of the adding racks 21 and type carriers 22. The total pin 38 during such item entering is held in lowered position so that the link 41 carrying this pin will occupy a position in which the lug 43 is above the lug 42 on the total lever 44 as is more clearly shown in Fig. 2 of Powers Patent No. 1,245,506. The link 41 is carried by a bell-crank 45 carrying a roller operated by a cam 46. The position of the bell crank is altered just before the cam arrives at the home position shown in Fig. 2. At the end of each operation the cam 46 operates the link 41 which will effect certain controls in all cases except when an item card is in the registration passage.

When a total card is in the sensing passage 28, the restricted movement of the total pin 38, as is well known in the art, will hold the lug 43 in alinement with the lug 42 at the time the cam 46 operates the link 41. This will operate the arm 47 and link 48 (see also Fig. 1 herein, and Fig. 3 of the Powers patent above mentioned) and cause the machine to take a total in the usual manner by rocking the total shaft 49 (Fig. 1).

When a stop card is in the sensing passage 28, the link 41 will be positioned as shown in Fig. 2 (Fig. 4 of the Powers patent) with the forward end of the rod 50, in line with the end of a bar 51 which is secured to a depending block 52 carried by a sliding rod 53 suitably supported and adapted to be manipulated from a knob 54. The depending block 52 is connected to a lever 55 in operative connection with a spring drawn clutch disengaging slide 56. As the bar 51 and sliding rod 53 are moved to the left, the slide 56 is projected into the path of a clutch rocker arm 57 carried by a disk 58 on the main shaft 13 and as the rock arm 57 is moved against the slide 56, it is rocked to disengage its roller 59 from an undercut plate 60 on a disk 61 driven from a motor (not shown).

This causes the main drive shaft 13 to come to rest in the position shown.

The effect of a stop card is to permit free movement of the total pin 38 and to hold the analyzing pins 37 in the positions shown and no registration will be made. If, for any reason, no card is in the registration passage 28 at the time the analyzing pin box 34 is raised, all of the analyzing pins 37 and the total pin 38 will rise. The effect of the rising of the total pin is to stop the machine and, as all analyzing pins 37 are in their raised positions, a zero registration will be made. This function of the total pin will be referred to later as it is made use of in carrying out this invention in which a stop arm 62 (Figs. 2, 5, 6, 7 and 9) is moved into the path of a lateral lug 63 on an arm 64 fastened to the shaft 30 to which the picker blade operating lever 29 is secured. Thus the stop arm 62 may arrest the movement of the picker blade 26 and cause the absence of a card in the sensing passage 28 which, in turn, causes the machine to stop, through the control set up by the total pin 38.

As the invention has for its object the stopping of the machine after a certain number of item, total, or combined item and total impressions have been made, it is sufficient to illustrate and describe only such portions of the adding and printing head as relate to the printing. The head usually comprises several adding and printing units but for illustrative purposes only one of these units is shown.

Figure 3:
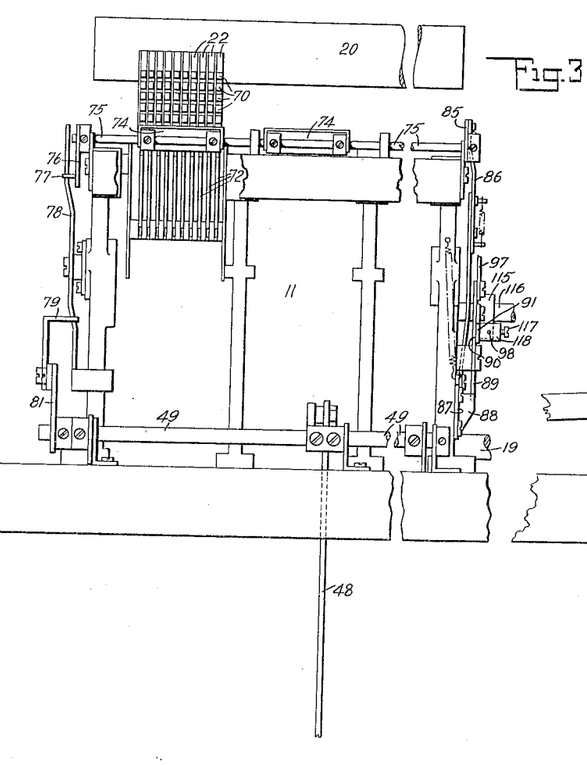
Fig. 3 is a front elevation of the adding and printing head with parts broken away.
Figure 4:
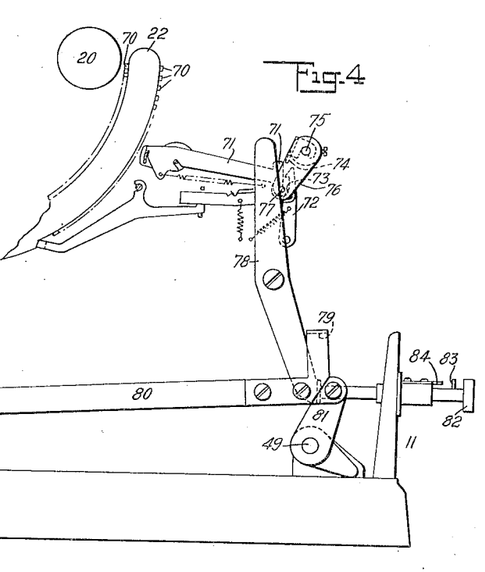
Fig. 4 shows in side elevation a part of the printing hammer control mechanism.

In Figs. 3 and 4 are illustrated the type carriers 22 of one unit. After the type carriers have been positioned, the type members 70 at the printing line of the platen 20 are actuated by hammers 71. The hammers 71 operate upon release of hooks 72 which are moved out of engagement with shoulders 73 on the hammers 71 under control of movement of the type carriers (as shown and described in detail in Letters Patent of the U. S. to W. W. Lasker No. 1,253,696, granted Jaanuary 15, 1918).

As is customary, means is provided for optionally preventing the printing of items. This means (frequently hereinafter called non-print means) consists of bails 74 (Figs. 3 and 4) which are adjustable on a shaft 75 and which when in the position shown in Fig. 4 arrest the hammers 71 when they are released by the hooks 72.

In order that the printing of totals be not interferred with by the bails 74, the rock shaft 75 to which they are adjustably fastened carries an arm 76 at its left end. This arm is provided with a pin 77 which lies in the path of a lever 78 operated by a lateral portion 79 on a link 80. Link 80 is pivoted on an arm 81 on the total shaft 49. It may now be seen that rocking movement of the total lever 44 (Fig. 2) lowers the link 48 and rocks the total shaft 49 counterclockwise (Fig. 4), thereby rocking the shaft 75 and bails 74 counterclockwise and enabling the hammers 71 to print totals even when the bails 74 are adjusted to prevent the printing of items, that is, to the position shown in Fig. 4.

The bails 74 may also be adjusted to their ineffective positions by a push button 82 (Fig. 4), which operates on the lever 78 and is provided with the usual pin 83 and catch 84 to hold it in operated position.

The movement of the shaft 75 to permit the hammers to operate is communicated by an arm 85 (Fig. 1A), to a link 86 which actuates a slide 87 provided with a lateral flange 88 which during non-printing is in the path of a shoulder 89 on a bell-crank 90 to which one end of a slide 91 is connected. When the push button 82 is set for printing or when a total is taken, the shaft 75 is rocked to lower the flange 88 out of the path of the shoulder 89 to permit the bell-crank 90 to be operated.

Figure 1A:
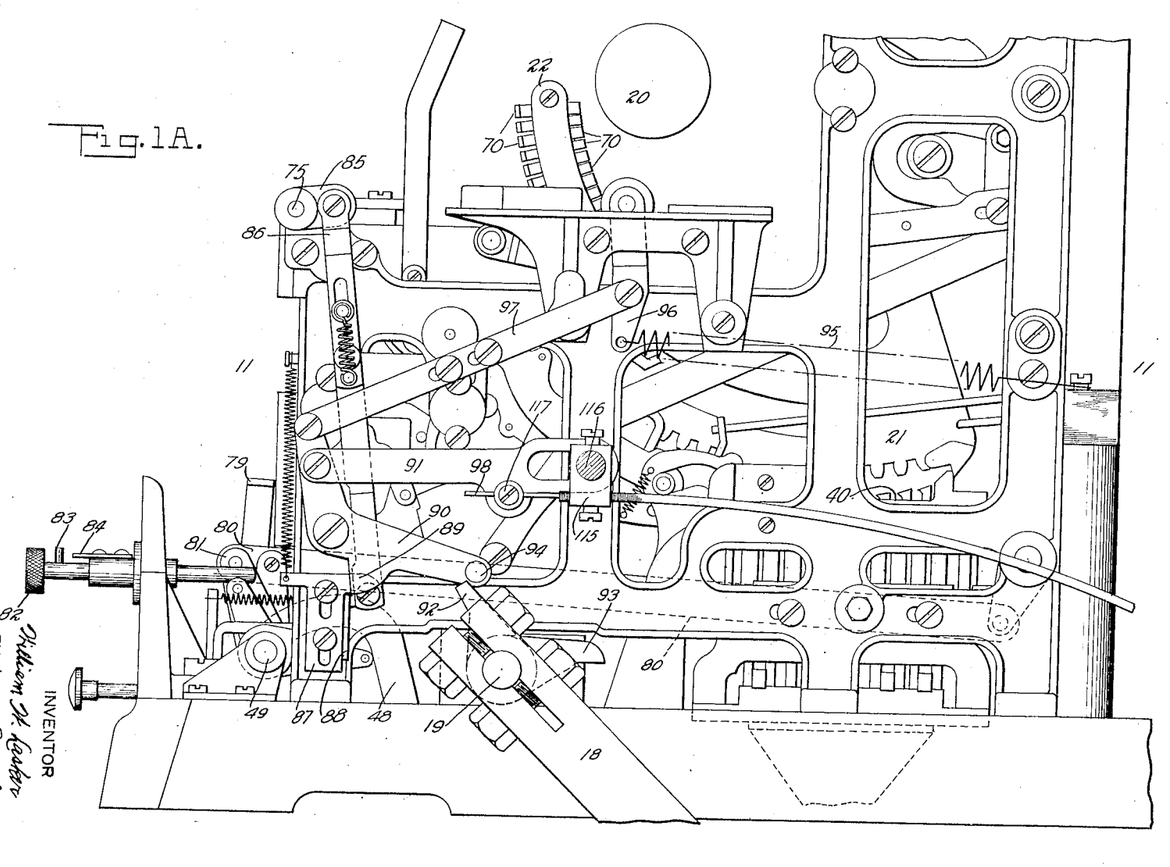
Fig. 1A is an enlarged view of the adding and printing head shown in Fig. 1.

As shown in Fig. 1A the bell crank 90 is operated counterclockwise on the return stroke of the main shaft 19 of the adding and printing head. This operation is effected by the co-operation of arm 92 on shaft 19 with pin 94 on the horizontal arm of bell crank 90. Return of bell crank 90 to normal position is assured by the spring 95 which acts through levers 96 and 97.

The slide 91 is connected to the bell crank 90 and serves to operate wire 98 whenever an impression is taken whether of items or totals. The machine is arrested whenever the arm 62 (Figs. 2, 5, 6, 7 and 9) is moved into the path of the lug 63 on the arm 64 in a manner hereinafter explained.

The mechanism for controlling the movement of the arm 62 is shown in Figs. 5 to 9. This mechanism is housed within the casing 23 which comprises a cover plate 100 Figs. 5, 6 and 8 secured by screws 101 and 102 to spacer studs 103 and 104 Figs. 5 and 9 projecting from a rear plate 105 and by a screw 106 secured to an ear 107 on said rear plate 105. The rear plate 105 is of the configuration shown in Fig. 9 and is secured to the base 10 of the machine by a pair of screws 108 extending through an offset portion 109 of the plate and by a pair of screws 110 extending through an offset plate 111 secured to the rear of the plate 105. The screws 110 are accessible through holes 112 in the plate 105.

The stud 103 is apertured to receive the housing 113 of the wire 98, said housing and wire together constituting the connection 24; and the housing 113 is secured in the stud by screw 114. The other end of the housing is similarly secured to a block 115 secured to a stud 116 on which the slide 91 operates. The wire 98 is secured to the slide 91 by a screw 117 having a threaded connection with a hollow transversely apertured stud carried by the slide 91.

The control mechanism includes a ratchet disk 120 (Figs. 5, 6, 7 and 8). The disk 120 is provided with a hub 121 rotatably mounted on a stud 122 on the rear plate 105. The disk is urged counterclockwise Figs. 5 and 7 by a clock spring 123 Fig. 9 anchored to the hub 121 and to a pin 124 projecting from the rear plate 105. The disk is moved step by step in a clockwise direction during each printing operation by the wire 98 of the Bowden wire connection, actuating a lever 125 pivoted on a stud on the rear of the plate 105 and carrying an actuating pawl 126 on stud 127 cooperating with the ratchet disk 120. The lever 125 carries a stud on which the wire 98 is retained by a screw 128. The disk 120 carries a pin 130 (Fig. 7) which is positioned to cooperate with a radial arm 131 on a toothed disk 132. Thus when the disk 120 reaches a predetermined position it moves arm 131 clockwise. When this movement occurs, arm 131 strikes a lateral flange 133 formed on the arm 134, which is pivoted on stud 135 fixed to rear plate 105. Also pivoted on the stud 135 is arm 62, and the arrangement of arms 134 and 62 is such that, when arm 134 is restored to normal position by the action of spring 136, it raises arm 62 with it. Moreover, arms 134 and 62 are connected by a spring 137 which causes 62 to follow 134, and to thus move into the path of lug 63, when arm 131 is moved clockwise as described above. It will thus be clear that as the wire 98 operates the pawl 126 and disk 120, the pin 130 will be moved toward the arm 131 and then will move this arm which in turn will place the arm 62 in the path of the lug 63. The parts are so arranged and proportioned that interception of the lug 63 and consequently the stopping of picker blade 26 occurs just before the picker blade has moved far enough to the left in Fig. 2 to let a card drop in front of the feeding shoulder 138 on the picker blade. This cessation of feeding leaves the pin box empty and in the subsequent analyzing movement of the analyzing pin box 34, the total pin 38 will cause the machine to stop. The movement of the arm 134 may be limited by a stud 190 secured to plate 105 entering a slot 191 in the arm as shown in Figure 9.

When arm 131 is actuated flange 133 is moved to the left of its normal position and its cam surface 139 engages a cam surface 140 (Fig. 5) on an arm 141 pivoted on a stud 142 on the rear plate 105. This arm has a pin and slot connection 143, 144 with the actuating pawl 126 which permits the pawl to be reciprocated while at the same time holding it in engaged position under the influence of a spring 145 which is connected to a stud 146 on the arm and to a stud 147 on the rear plate 105. A roller on the stud 146 supports the pawl 126 as it is being reciprocated. As the cam surface 140 is engaged by the flange 133 the arm 141 is lowered and releases the pawl 126 from the action of the spring. As the pawl 126 is returned to the right (Fig. 7), it engages the cam surface 139 on the flange 133 and is depressed thereby out of engagement with the teeth of the ratchet disk 120.

Figure 5:
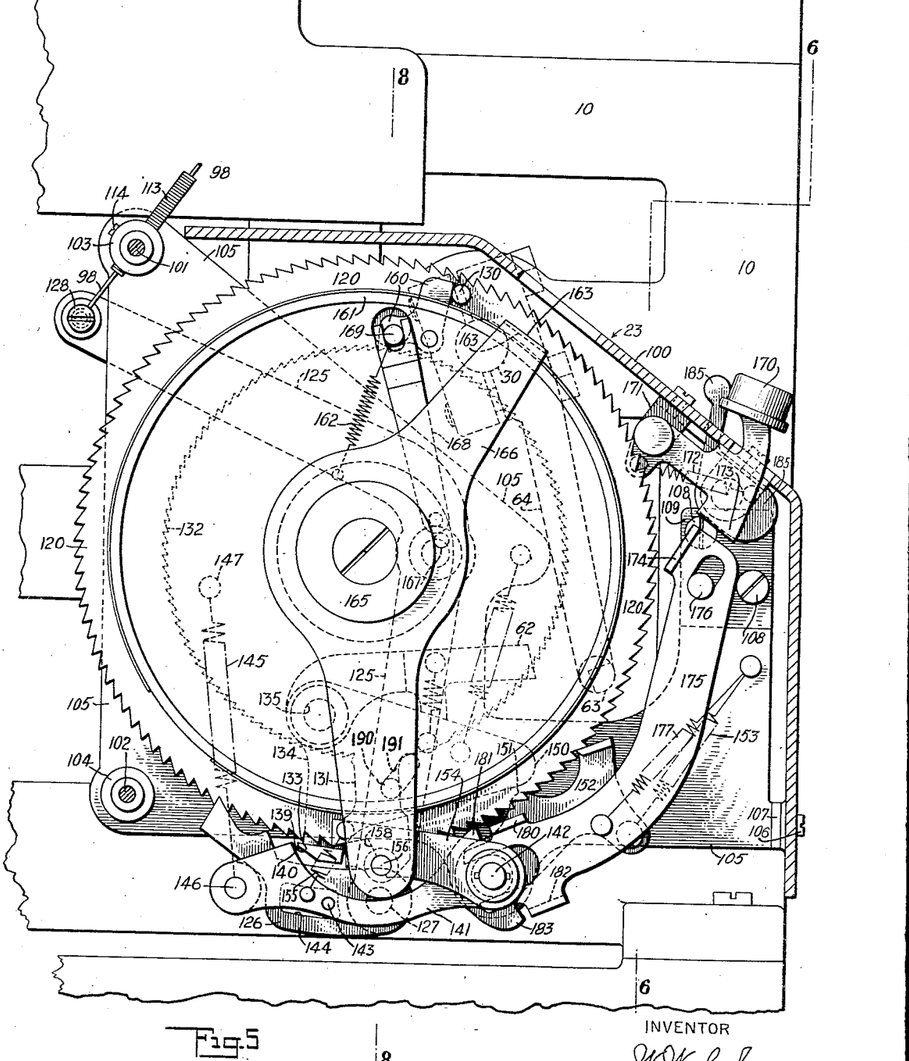
Fig. 5 is a right side elevation of the control mechanism as viewed with its cover in section.
Figure 7:
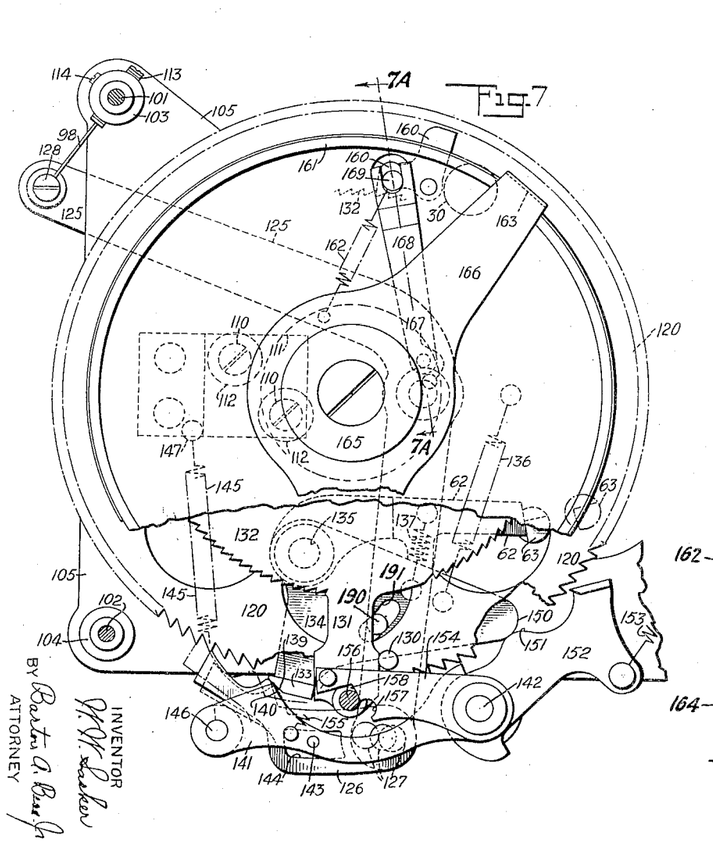
Fig. 7 shows some of the mechanism of Fig. 5 in card feed arresting position.
Figures 7A, 8:
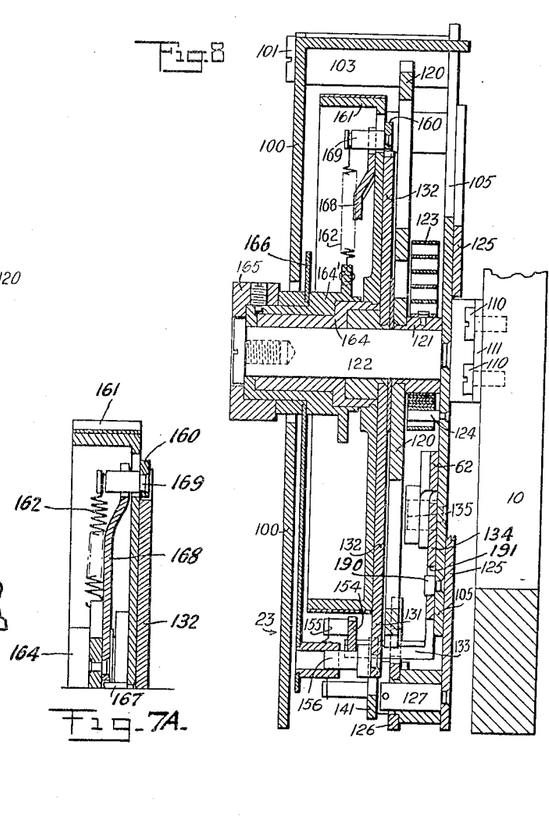
Fig. 7A is a sectional view on line 7A—7A of Fig. 7.
Fig. 8 is a section on line 8—8 of Fig. 5.
Figure 9:
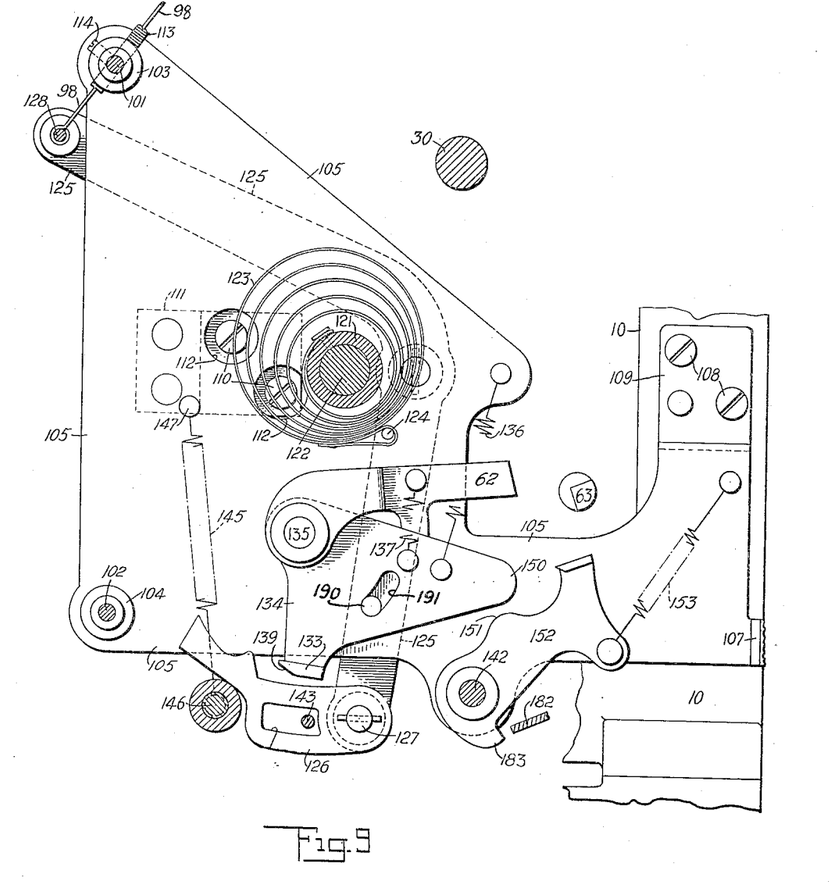
Fig. 9 shows details of the control mechanism.

As the flange 133 and its associated arm 134 is moved to the left by the rotation of arm 131 from the position shown in Fig. 5 to that shown in Figs. 7 and 9, a cam surface thereof engages a portion 151 of a retaining pawl 152 pivoted on a stud 142 and spring pulled into engagement with the ratchet disk 120 by a spring 153. Upon movement of the flange 133, both pawls 126 and 152 will be disengaged and the disk 120 will be permitted to return to its starting position.

The flange 133, arm 62 and pawls 126 and 152 are held in their inoperative position until the disk 120 has returned to its selected position, by a pawl 154 pivoted on the stud 142. This pawl is spring pressed by a spring 155 against a stud 156 on the arm 131. When the arm 131 is in its normal position (Fig. 5) the stud 156 engages a recess 157 (Fig. 7) in the pawl 154 and in its moved position it engages a cam surface 158 on the pawl 154 as shown in Fig. 7. The front edge of the arm 131 engages the flange 133 and holds the parts in inoperative position.

When the stud 130 (Fig. 5) reaches its selected position as the disk 120 is rotated counter-clockwise by its spring 123, it engages a ratchet pawl 160 pivoted on an index drum 161 and spring pressed into engagement with the ratchet disk 132 by a spring 162. This engagement moves disk 132 to the left (Fig. 7), carrying the arm 131 counter-clockwise thereby raising pawl 154 through engagement of the stud 156 with the cam surface 158 thus removing the end of this pawl from the flange 133 permitting the arm 62 and pawls 126 and 152 to return to the position shown in Fig. 5.

The index drum 161 is provided with numerals and spaces cooperating with a pointer 163 for reading the position of the drum 161. The drum is mounted on a sleeve 164 on the stud 122 which extends outside of the cover plate 100. The pointer 163 is a laterally turned end of a lever 166 loosely mounted on a sleeve 164' rotatably mounted on the sleeve 164. The lower end of the lever 166 is provided with a hollow stud receiving the end of stud 156 on the arm 131.

The index drum 161 may readily be adjusted by means of the knob 165 secured to the sleeve 164'. Secured to a flange on the sleeve 164' is a link 168 (Fig. 7A) which engages a pin 167 on the hub of the index drum 161 and a pin 169 on the ratchet pawl 160. For effecting clockwise adjustment of the drum 161 the knob 165 is turned clockwise and by engagement of the link 168 with the pin 167, the drum 161 is carried with it. The pawl 160 rides over the teeth of disk 132. If in this movement the pawl 160 engages the pin 130, it will carry the ratchet disk 120 with it. Upon counter-clockwise movement of the knob 165, the free end of the link 168 will, through its operation on the pin 169, first disengage the pawl 160 from the disk 132 and thereby free the index drum 161, and upon continued movement the link 168 moves the index drum 161 counter-clockwise to the desired position.

Figure 6:
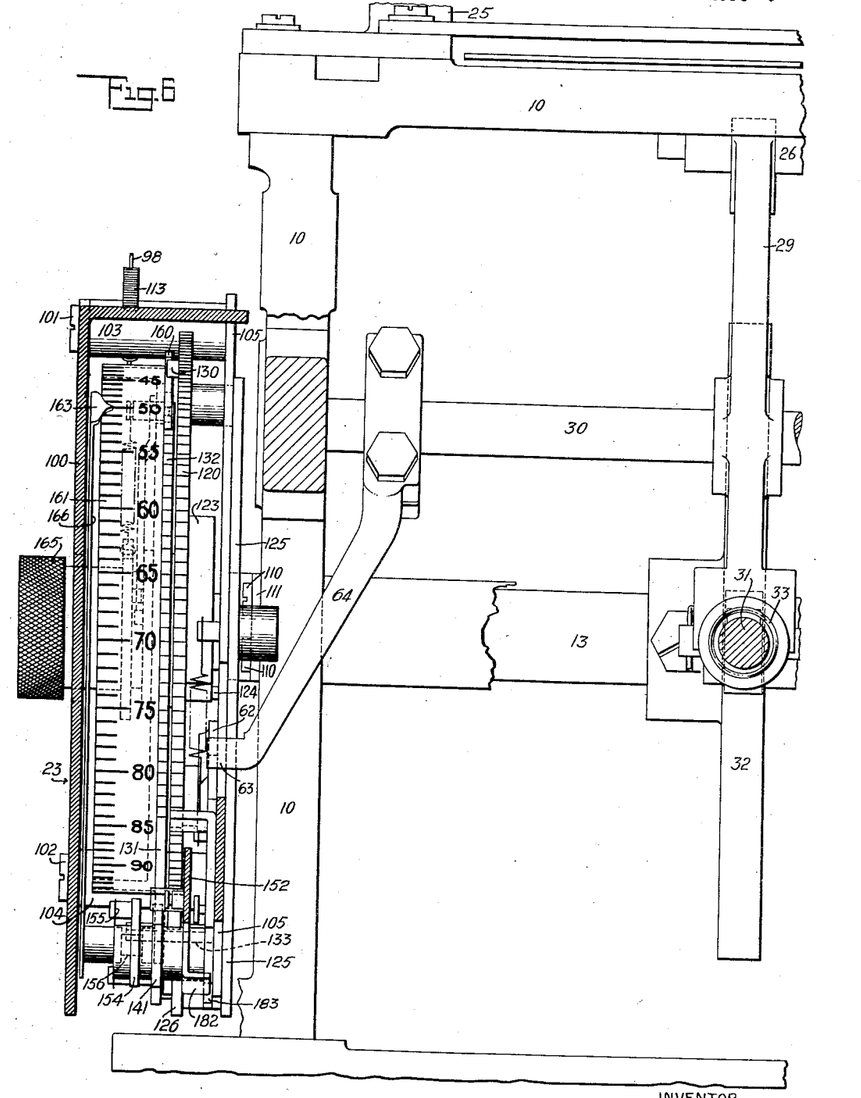
Fig. 6 is a sectional view on line 6—6 of Fig. 5 of parts of the control mechanism showing its connection with the card feeding mechanism of the tabulating machine.

As shown in Figs. 5 and 6, the drum 161 is adjusted to count 50 cards. If, however, the drum had been adjusted to count 10 cards the pawl 160 and associated arm 168 would be positioned approximately opposite pawl 152.

The pawls 126 and 152 may be disengaged by pressing a key lever 170 (Fig. 5) pivoted to a bracket 171 on the cover plate 100 and spring pressed upwardly by a spring 172. The key is provided with an extension 173 to engage a flange 174 on a bar 175 slidable on a stud 176 on the rear plate 105 and the stud 142, and spring pressed upwardly by a spring 177. Pressure on the key lowers the bar 175 which is provided with a flange 180 to engage an ear 181 on the arm 141 and a flange 182 to engage a flange 183 on the pawl 152. The engagement of flange 180 with ear 181 rotates arm 141 counter-clockwise and disengages pawl 136. The engagement of flange 182 with ear 183 rotates pawl 152 clockwise, thereby causing its disengagement and permits the disk 120 to return to its selected starting position.

By means of an L-shaped lever 185 adapted to operate on the flange 174, the bar 175 may be lowered and locked down and operation of the control mechanism prevented.

*Operation*

The index drum 161 is adjusted to locate the number corresponding to the desired number of cards to be analyzed opposite the indicator by movement of the knob 165 in either direction as required. If the pin 130 on the ratchet disk 120 is not in contact with the pawl 160, the key 170 may be depressed to release the feeding and retaining pawls 126 and 152 whereupon the spring 123 will rotate the ratchet disk 120 counter-clockwise.

If it is desired to stop the machine after ten item impressions the index drum is adjusted to 10 and the push button 82 is pushed in and latched to cause impressions to be made and to enable the pawl 126 to be operated by the slide 91. During the tenth operation of the pawl 126, the pin 130 moves the arm 131 from the position shown in Fig. 5 to that shown in Fig. 7. This positions the arm 62 in the path of arm 63 to disable the picker blade and cause the machine to stop due to the absence of a card in the sensing passage, and releases the ratchet disk 120 which is now returned by its spring. The parts are held in their moved positions during the return of the ratchet disk by the pawl 154 blocking the return movement of lug 133 on arm 134. As the pin 130 contacts with pawl 160 it drives the disk 132 and arm 131 counter-clockwise to cam out the pawl 154 and permit the feeding and retaining pawls 126 and 152 and the arm 62 to return to the position shown in Figure 5.

If the machine is to stop after ten item impressions and the total impression, the index drum will be set to 12 as the actuating pawl 126 will operate during the usual idle stroke preceding the total stroke and in the total stroke.

If the machine is to stop after ten total impressions the index drum is set to 10 and the push button 82 is pulled out to prevent impressions of items. Totals are printed automatically during a total operation independently of any control set up by the push button 82.

If it is found desirable to print more items than the index drum is set for, before the machine comes to rest, the ratchet disk 120 can be released by the key 170 to return to its starting point.

The control device may be entirely disabled by the lever 185 which throws out the actuating and retaining pawls 126 and 152 without affecting the position of the arm 62.

What I claim as new and desire to secure by Letters Patent, is:

1. In a machine of the class described, the combination of a card supply magazine, a tabulating mechanism comprising analyzing mechanism and adding and printing mechanisms, means for feeding the cards from the supply magazine to the analyzing mechanism, means for controlling the machine to print totals, and means automatically operable for interrupting the feeding of cards after any predetermined number of total impressions have been made by said printing mechanism.

2. In a machine of the class described, the combination of a card supply magazine, a tabulating mechanism comprising analyzing mechanism and adding and printing mechanisms, means for feeding the cards from the supply magazine to the analyzing mechanism, means for setting the machine to print items, means for automatically printing totals, and means automatically operable for interrupting the feeding of cards after any predetermined number of item and total impressions have been made by said printing mechanism.

3. In a machine of the class described, the combination of card analyzing mechanism and printing mechanism, means for automatically printing totals, means for stopping the machine, and means controlled by the printing mechanism for causing said stopping means to function after the printing of any predetermined number of totals.

4. In a machine of the class described, the combination of card feeding means, means for interrupting the feeding after any predetermined number of cards have been fed, and means operable as a result of and after such interruption of said feeding means for stopping the machine.

5. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, and a radial arm on said first disk against which said pin is moved to limit the forward movement of said second disk.

6. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, a radial arm on said first disk against which said pin is moved to limit the forward movement of said second disk, and means operated by said radial arm for disabling said pawl for moving said second disk.

7. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, a radial arm on said first disk against which said pin is moved to limit the forward movement of said second disk, a retaining pawl for said second disk, and means operated by said arm for disabling said actuating and retaining pawls.

8. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, a radial arm on said first disk against which said pin is moved to limit the forward movement of said second disk, a retaining pawl for said second disk, means operated by said arm for disabling said actuating and retaining pawls, and means for retaining said arm in moved position.

9. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, a radial arm on said first disk against which said pin is moved to limit the forward movement of said second disk, a retaining pawl for said second disk, means operated by said arm for disabling said actuating and retaining pawls, means for retaining said arm in moved position, and means on said arm and its retaining means for releasing said arm as said arm is moved by engagement of said pin with said limiting ratchet pawl.

10. In a machine of the class described, tabulating mechanism for printing and adding amounts, and means for arresting the machine after a predetermined number of amounts have been printed, said means comprising a ratchet disk having a limited amount of movement, an index drum adjustable with respect to said disk, a pointer on said disk cooperating with said drum, a radial arm on said disk, a second ratchet disk, a pawl for actuating said second disk by increments, a limiting ratchet pawl on said drum cooperating with said first mentioned disk, a pin on said second disk adapted to abut said pawl to limit the return movement of said second disk, a radial arm on said first disk against which said pin is moved to limit the forward movement of said second disk, a control member positioned by said arm as the arm is moved during the last step of movement of said second disk, a retaining pawl for said second disk, and means operated by said control member for releasing said actuating and retaining pawls.

11. In a machine of the class described, a movable blocking member adapted to cause the machine to stop, a control member therefor operable after any predetermined number of operations of the machine to move said blocking member into functioning position, actuating and retaining pawls for said control member, means operable as the control member is moved into blocking position for withdrawing said actuating and retaining pawls, spring means for returning said control member, means for maintaining said block in functioning position and said pawls withdrawn as said control member returns to its starting point, and means operated by said control member as it reaches its starting point for actuating said maintaining means to release said block and pawls.

12. In a machine of the class described, the combination of a printing mechanism, a card picker, means for blocking the movement of the picker during its movement to a position in which it can pick up a card, and means comprising a settable element and an actuable element, means for moving said actuable element one step upon each operation of the printing mechanism, and means carried by said settable element operable by said actuable element during its final step of movement for moving said blocking means into functioning position.

13. In a machine of the class described, the combination of card analyzing mechanism and adding and printing mechanism, means for controlling the printing and non-printing of items, means for automatically printing totals irrespective of the setting of said controlling means, means for stopping the machine, and means controlled by the printing mechanism for bringing said stopping means into action after a predetermined number of printing operations.

14. In a machine of the class described, a tabulating mechanism including a card feeding means, a counting means controlling a mechanism for disabling said feeding means after any predetermined number of cards have been fed, and a card sensing device including a series of sensing pins, one of said pins being adapted to control means for stopping the machine when said card feeding means is disabled.

WILLIAM W. LASKER.